April 11, 1939.  E. L. HARDER  2,154,270

COMPENSATING METERING APPARATUS

Filed Nov. 24, 1937

WITNESSES:

INVENTOR
Edwin L. Harder.
BY
ATTORNEY

Patented Apr. 11, 1939

2,154,270

UNITED STATES PATENT OFFICE 2,154,270

COMPENSATING METERING APPARATUS

Edwin L. Harder, Forest Hills, Pa., assignor to Westinghouse Electric & Manufacturing Company, East Pittsburgh, Pa., a corporation of Pennsylvania Application November 24, 1937, Serial No. 176,253

7 Claims. (Cl. 171—34)

My invention relates to compensators for use with alternating-current power apparatus and particularly to such compensators for counteracting the effects of both series impedance and shunt admittance of a circuit between a point at which variables are to be measured and a different point at which the measuring apparatus is located. Although not limited thereto, my invention is particularly applicable to the compensation of the impedance and admittance effects of transformers, so as to provide accurate measurement of quantities on one side of a transformer by means of metering apparatus located entirely on the other side of the transformer.

I am aware that compensating metering methods have heretofore been proposed for measuring the real power interchange between a transformer and a power circuit, by means of metering apparatus located entirely on the other side of the transformer from the power circuit. So far as I am aware, however, such methods, as applied to three-phase apparatus, have not taken into account the variations of transformer losses with unbalance of the transformer load.

It is, accordingly, an object of the invention to provide a novel compensating metering system which will provide accurate measurement of a vector component, such as total reactive power or total real power, of the volt-ampere transfer between a three-phase transformer or bank of transformers and a power circuit, by means of measuring apparatus located entirely on the other side of the transformer from the power circuit, irrespective of the degree of unbalance of transformer load.

Another object of my invention is to provide a novel compensating metering system for use with a transformer, which will take into account the variations of transformer iron loss from a linear relationship with the square of transformer induced voltage.

Figure 1:
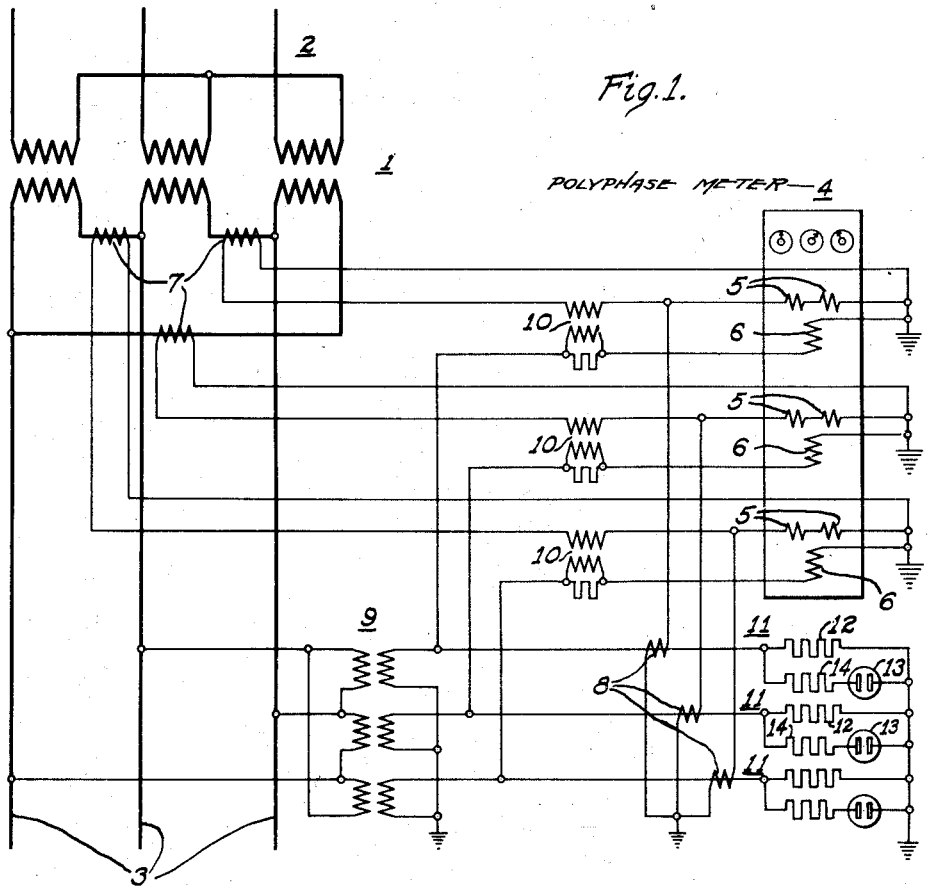
Figure 2:
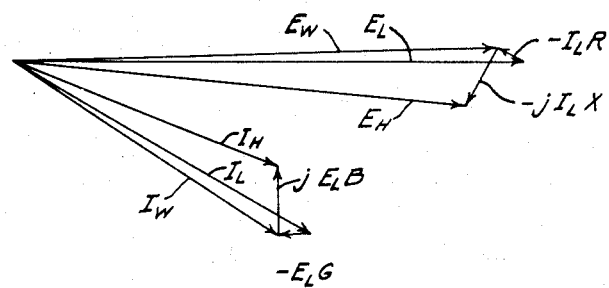

Other objects of my invention will become evident from the following detailed description taken in conjunction with the accompanying drawing, in which:

Figure 1 is a diagrammatic view of a transformer and metering installation embodying my invention, as applied for the measurement of real power; and, Fig. 2 is a vector diagram showing the relationship of variables for one phase of the apparatus shown in Fig. 1.

Referring to Figure 1 of the accompanying drawing, in detail, a polyphase transformer bank 1 is connected on its high-voltage side to a polyphase high-voltage load circuit 2, such as a transmission line, and on its low-voltage side to a low-voltage polyphase supply circuit 3, which may be a generator bus. As shown, the high-voltage windings of the transformer bank 1 are connected in star, and the low-voltage windings are connected in delta.

The transformer bank 1, in accordance with the usual practice, is operated in such a range of induction that its iron loss varies as a higher power than the square of its induced voltage. For example, within the range of voltage variation normally encountered, (which may be as much as 25%), the transformer iron loss may vary as the 4th or 5th power of the transformer induced voltage in extreme cases.

A polyphase watthour meter 4 is provided for measuring a vector component of the volt-ampere transfer between the high-voltage circuit 2 and the transformer bank 1, by means of electrical quantities taken entirely from the low-voltage side of the transformer bank 1. It will be understood that the volt-ampere transfer between each phase of the high-voltage circuit 2 and the corresponding phase of the transformer bank 1 may be represented vectorially as the sum of real and quadrature components $P_H + jQ_H$, corresponding respectively to real power and reactive power. Similarly, the series impedance per phase of the transformer bank 1 may be represented as the sum of two vectors $R + jX$, corresponding to resistance and leakage reactance. Also the shunt admittance, per phase, of the transformer bank may be represented as the resultant of two vectors $G - jB$, corresponding respectively to the magnetizing conductance and magnetizing susceptance of the transformer bank.

In accordance with the principle of my invention, measurement of either power component $P_H$ or $jQ_H$ requires compensation only for the impedance and admittance components having the same operator, 1 or $j$. That is to say, correct readings of real power $P_H$ may be obtained by compensating for the real quantities R and G only, and correct readings of reactive power $jQ$ may be obtained by compensating for the reactive quantities $jX$ and $-jB$ only. The invention will be described as applied to the measurement of real power $P_H$, the real quantities R and G being compensated.

The polyphase watthour meter 4 includes the usual three elements, each of which is provided with a pair of current windings 5 and a potential winding 6. The current windings 5 are each connected to respond to the resultant of the secondary current of an insulating current transformer 7, connected within the delta circuit of the transformer bank 1, and a current component supplied by an auxiliary current transformer 8.

The potential windings 6 are each connected to respond to the resultant of a voltage proportional to the corresponding phase-to-phase voltage of supply circuit 3, supplied by a line potential transformer 9, and a compensating voltage supplied by a compensator 10.

The auxiliary current transformers 8 are each connected in series with a variable impedance unit 11 to the secondary terminals of the potential transformer 9 of corresponding phase. The purpose of the variable impedance units 11 is to draw a current proportional at all times to the component of exciting current of the corresponding phase of transformer bank 1, which traverses the component of transformer admittance being compensated.

As the quantity G, corresponding to transformer iron losses, is being compensated, and as this quantity varies somewhat with transformer induced voltage, it is necessary that the variable impedance units 11 draw non-inductive current having a non-linear relationship to impressed voltage. As the transformer iron losses vary exponentially at a higher rate than the square of the induced voltage, the impedance units 11 must have a rising volt-ampere characteristic, that is, with increase of voltage impressed upon one of the units 11, the current drawn thereby must increase more rapidly than the impressed voltage. This requirement is satisfied by a number of circuit arrangements, that illustrated comprising a resistor 12, and a shunt circuit including a neon glow-tube 13 and a second resistor 14.

When the secondary crest voltage of the potential transformers 9 is below the break-down voltage of the glow-tubes 13, the resistors 12 only draw current. When the secondary crest voltage of the potential transformers 9 exceeds the breakdown voltage of the glow-tubes 13, the shunt circuit also draws current which increases in amount with increase of voltage.

The impedance units 11, as suggested above, are designed to draw non-inductive current proportional to the real component of exciting current of the corresponding phase of transformer bank 1. The auxiliary current transformers 8 are of such ratio as to transform the current drawn by the impedance units 11 to the same ratio base as the secondary current of insulating current transformers 7.

The compensators 10 are designed to introduce a voltage in the circuits of potential windings 6, proportional to the real component of leakage impedance voltage drop in the corresponding phase of the transformer bank 1, reduced to the same ratio base as the secondary voltages of the potential transformers 9.

The operation of the above-described apparatus may better be understood by considering the power flow through one phase of the transformer bank 1, the corresponding vectors being illustrated in Fig. 2.

Let—

$E_L$=voltage for one phase on low-voltage side of transformer bank 1
$I_L$=delta current of the corresponding phase in transformer bank 1
$E_H$=line-to-neutral voltage of the corresponding phase on the high-voltage side of transformer bank 1
$I_H$=corresponding phase current in high-voltage side
$E_W$=voltage applied to corresponding meter element
$I_W$=current supplied to corresponding meter element
$P_L$=real power supplied to corresponding phase of transformer bank 1 on low side
$P_W$=component of meter reading produced by phase considered
$I_{LP}$=component of low side current in phase with $E_L$
$I_{LQ}$=component of low side current in quadrature with $E_L$
$X$=transformer total reactance for the phase considered
$R$=transformer total series resistance for the phase considered
$G$=transformer exciting conductance per phase
$B$=transformer exciting susceptance per phase Assuming a lagging load, and taking the vector $E_L$ as reference, the total current on the low-voltage side is $$I_L = I_{LP} - jI_{LQ} \qquad (1)$$

The voltage applied to the corresponding phase element of the meter 4 is $$E_W = E_L - I_L R \qquad (2)$$

The current supplied to the corresponding phase element of the meter 4 is $$I_W = I_L - E_L G \qquad (3)$$

The line-to-neutral voltage on the high-voltage side of the transformer bank 1 is, for the phase considered, $$E_H = E_L - I_L(R + jX) \qquad (4)$$

The corresponding phase current for the high-voltage side is $$I_H = I_L - E_L(G - jB) \qquad (5)$$

The total low side real power is, for the phase considered, $$\bar{P}_L = \bar{E}_L \bar{I}_{LP} \qquad (6)$$

The component of the meter reading produced by the power flow in the phase considered is $P_W$=real component of $E_W \hat{I}_W$
  =real component of $(E_L - I_L R)(\hat{I}_L - E_L G)$ (7)

Substituting (1) in (7)

$P_W$=real component of $(E_L - I_{LP}R + jI_{LQ}R)$
  $(I_{LP} + jI_{LQ} - E_L G)$
  $= E_L I_{LP} - E_L^2 G - I_{LP}^2 R + E_L I_{LP} R G - I_{LQ}^2 R$ ___(8)

The total high side real power is, for the phase considered, $P_H$=real component of $E_H \hat{I}_H$
  =real component of
  $(E_L - I_L R - jI_L X)(I_L - E_L G - jE_L B)$ _____(9)

Substituting (1) in (9)

$P_H$=real component of $(E_L - I_{LP}R + jI_{LQ}R -$
  $jI_{LP}X - I_{LQ}X)(I_{LP} + jI_{LQ} - E_L G - jE_L B)$ _(10)

Multiplying out real components of (10)

$P_H = E_L I_{LP} - E_L^2 G - I_{LP}^2 R + E_L I_{LP} R G - I_{LQ}^2 R +$
  $E_L I_{LQ} R B + I_{LP} I_{LQ} X - E_L I_{LP} X B -$
  $I_{LP} I_{LQ} X + E_L I_{LQ} X G$ _____(11)

The total error is (11) minus (8)

$K = P_H - P_M$
  $= E_L I_{LQ} R B + E_L I_{LP} X B + E_L I_{LQ} X B$ ___(12)

As examples of typical values, the iron loss of transformer 1 may be assumed as .004 times full load power; full load copper loss as .004 times full load power; impedance as 10%; exciting current is 4.5%. For the purpose of calculating the metering error it may be assumed that $I_L=1$ and $E_L=1$.

$I_L=1$
$E_L=1$
$G=.004$ approximately
$X=.10$ approximately
$B=.0044$ approximately At full load 100% p. f., $I_{LP}=1$, $I_{LQ}=0$; the calculated error is, from (12), $$K=0+.1\times.0044+0=.00044$$
$$=.04\%$$

At full load, 80% p. f. lag, $I_{LP}=.08$, $I_{LQ}=.6$; the calculated error is $$K=.6\times.004\times.0044+.8\times.1\times.0044$$
$$+.6\times.1\times.0044=.000626$$
$$=.06\%$$

At full load, 80% p. f. leading, $I_{LP}=.8$, $I_{LQ}=-.6$, the calculated error is $$K=-.000011+.000352-.000264=.000077$$
$$=.01\%$$

At no load the calculated error is zero.

The above calculation of error involves approximations in Equations 4 and 5 which neglect terms of the order $E_L X^2 G$. These terms when multiplied out in power products produce maximum error terms of the order $EL^2X^2G$, which numerically are of the order of .0004%.

It will be noted that the connections of current transformers 7 within the delta provides correction of the individual delta voltages in accordance with the components of $I_L$ drops in phase therewith. Similarly, the auxiliary current transformers 8 and variable impedance units 11 provide correction of the individual power currents in accordance with components of exciting currents in phase therewith. Because of these relationships, correction for the error produced by zero sequence current circulating in the delta, which may arise because of lack of symmetry in the impedances of transformer bank 1, automatically occurs. Similarly, the effects of negative sequence current arising from unbalanced load are automatically compensated.

I do not intend that the present invention shall be restricted to the specific structural details, arrangement of parts, or circuit connections herein set forth, as various modifications thereof may be effected without departing from the spirit and scope of my invention. I desire, therefore, that only such limitations shall be imposed as are indicated in the appended claims.

I claim as my invention:

1. In an alternating-current system of transmission and distribution, a first polyphase power circuit; a second polyphase power circuit; power transformer apparatus connected in power transference relationship between said circuits, said transformer apparatus having windings connected in a delta circuit to said second circuit; polyphase meter apparatus to be energized in accordance with a vector component of the volt-ampere transfer between said first circuit and said transformer apparatus, said meter apparatus comprising a plurality of elements each having a current circuit and a voltage circuit; a plurality of similar current transformers connected in said delta circuit; means for energizing each of said current circuits in accordance with the vector sum of the secondary current of said current transformer of corresponding phase and a current proportional to the component of the power transformer magnetizing current of corresponding phase having the same operator as said vector component; and means for energizing each of said voltage circuits in accordance with a vector sum of the corresponding phase-to-phase voltage of said second circuit and a voltage proportional to the component of the power transformer impedance voltage drop of corresponding phase having the same operator as said vector component.

2. In an alternating-current system of transmission and distribution, a first polyphase power circuit; a second polyphase power circuit; power transformer apparatus connected in power transference relationship between said circuits, said power transformer apparatus having windings connected in a delta circuit to said second circuit; polyphase meter apparatus to be energized in accordance with the real power flow between said first circuit and said transformer apparatus, said meter apparatus comprising a plurality of elements each having a current circuit and a voltage circuit; a plurality of similar current transformers connected in said delta circuit; means for energizing each of said current circuits in accordance with a vector sum of the secondary current of said current transformer of corresponding phase and a current proportional to the real power component of the power transformer magnetizing current of corresponding phase; and means for energizing each of said voltage circuits in accordance with a vector sum of the corresponding phase-to-phase voltage of said second circuit and a voltage proportional to the power component of the power transformer impedance voltage drop of corresponding phase.

3. In an alternating-current system of transmission and distribution, a polyphase high-voltage power circuit; a polyphase low-voltage power circuit; power transformer apparatus connected in power transference relationship between said circuits, said power to transformer apparatus having windings connected in a delta circuit to said low voltage circuit; polyphase meter apparatus to be energized in accordance with a vector component of the volt-ampere transfer between said high-voltage circuit and said transformer apparatus, said meter apparatus comprising a plurality of elements each having a current circuit and a voltage circuit; a plurality of similar current transformers connected in said delta circuit; means for energizing each of said current circuits in accordance with the vector sum of the secondary current of said current transformer of corresponding phase and a current proportional to the component of the power transformer magnetizing current of corresponding phase having the same operator as said vector component; and means for energizing each of said voltage circuits in accordance with a vector sum of the corresponding phase-to-phase voltage of said low-voltage circuit and a voltage proportional to the component of the power transformer impedance voltage drop of corresponding phase having the same operator as said vector component.

4. In an alternating-current system of transmission and distribution, a polyphase high-voltage power circuit; a polyphase low-voltage power circuit; power transformer apparatus connected in power transference relationship between said circuits, said power transformer apparatus having windings connected in a delta circuit to said low-voltage circuit; polyphase meter apparatus to be energized in accordance with the real power transfer between said high-voltage circuit and said transformer apparatus, said meter apparatus comprising a plurality of elements each having a current circuit and a voltage circuit; a plurality of similar current transformers connected in said delta circuit; means for energizing each of said current circuits in accordance with a vector sum of the secondary current of said current transformer of corresponding phase and a current proportional to the real power component of the power transformer magnetizing current of corresponding phase; and means for energizing each of said voltage circuits in accordance with a vector sum of the corresponding phase-to-phase voltage of said low-voltage circuit and a voltage proportional to the power component of the power transformer impedance voltage drop of corresponding phase.

5. In combination with a power transformer operated in a range of induction such that its magnetizing loss bears a non-linear relationship to the square of its induced voltage; a meter for measuring a power condition dependent upon said loss; means for producing a current having a non-linear relationship to a terminal voltage condition of said transformer; and means for energizing said meter in accordance with a second degree variable dependent upon said current, said second degree variable having such relationship to said terminal voltage condition as to maintain an approximately linear relationship between said loss and the indication of said meter corresponding thereto.

6. In combination with a power transformer operated in a range of induction such that its magnetizing loss bears a non-linear relationship to the square of its induced voltage; a meter for measuring a power condition dependent upon said loss, said meter having a voltage circuit and a current circuit; means for producing a current having a non-linear relationship to a terminal voltage condition of said transformer; means for energizing said voltage circuit in accordance with said terminal voltage condition; and means for energizing said current circuit in accordance with said current, said current having such relationship to said terminal voltage condition as to maintain an approximately linear relationship between said loss and the indication of said meter corresponding thereto.

7. In an alternating-current system of transmission and distribution, a first power circuit; a second power circuit; a transformer connected in power transference relationship between said circuits, said transformer being operated in a range of induction such that its magnetizing loss bears a non-linear relationship to the square of its induced voltage; a meter for measuring the power transfer between said transformer and said first circuit, said meter having a current circuit and a voltage circuit; means for producing a current component having a non-linear relationship to the voltage of said second circuit; means for energizing said current circuit in accordance with a vector resultant of said current component and a power current component of said second circuit; and means for energizing said voltage circuit in accordance with a vector resultant of the voltage of said low-voltage circuit and the real power component of impedance voltage drop in said transformer.

EDWIN L. HARDER.